FIG. 3

INVENTOR.
HOWARD F. MATTIL

INVENTOR.
HOWARD F. MATTIL

United States Patent Office 3,323,339
Patented June 6, 1967

3,323,339
METHOD AND APPARATUS FOR CORRUGATING TUBES
Howard F. Mattil, Yonkers, N.Y., assignor to Phelps Dodge Copper Products Corporation, New York, N.Y., a corporation of Delaware
Filed Oct. 30, 1963, Ser. No. 320,082
20 Claims. (Cl. 72—78)

This invention relates to a method and apparatus for continuously corrugating tubes. More particularly, it relates to a method and apparatus especially suitable for continuously forming deep corrugations in a thin-wall tube and for avoiding substantial torsional stresses in the tube during the corrugating operation.

Tubes have been corrugated heretofore by apparatus having a hollow rotating head carrying a grooving tool. The tube is advanced continuously through the head along its rotation axis so that the tool is rotated about the advancing tube while in groove-forming engagement with the tube.

The grooving tool has taken various forms in such prior apparatus. For example, it may consist of a member at least partly surrounding the tube and having at its inner surface a concave working edge engaging the tube periphery to form a helical corrugation as the tube is advanced, as disclosed in British Patents Nos. 791,513 and 791,514 published Mar. 5, 1958. In another form, the grooving tool comprises a plurality of roller discs mounted on the head in spaced relation about the tube and rotatable on axes generally parallel to the head axis, whereby the disc peripheries engage the tube periphery to form therein a helical corrugation as the tube advances through the rotating head, as disclosed in U.S. Patent No. 2,817,363 dated Dec. 24, 1957.

Apparatus of this rotating head type as made heretofore have the disadvantage that the rotating head transmits a torque to the tube through the grooving tool as the latter impresses the corrugation. This torque creates objectionable stresses and strains in the tube and in many instances requires an anti-torque device, such as a caterpillar, for gripping the advancing tube adjacent the corrugating apparatus to prevent transmission of the torque through the tube to a preceding or subsequent operation thereon.

A further disadvantage of prior apparatus of this type is that it is unsuited for forming deep corrugations in thin-walled tubes, due to the fact that the corrugation groove is impressed suddenly to its full depth with a resulting tendency of the grooving tool to break or fracture the thin metal.

Still another disadvantage of such prior apparatus is that it is suitable for forming only a helical groove or corrugation on the tube, whereas it is sometimes desirable to corrugate the tube by forming annular grooves. Heretofore, annular corrugation of tubes has been effected by advancing the tube through a stationary frame which mounts four gear-like rollers driven synchronously about axes lying in a plane normal to the tube axis, each roller having a grooved periphery embracing one-quarter of the tube circumference. As disclosed in British Patent No. 711,305 published June 30, 1954, these four rollers have peripheral teeth which, as the rollers are driven, engage the tube periphery to impress the annular grooves while drawing the tube through the stationary frame. The latter type of apparatus, however, lacks many of the advantages of the rotating head type and is generally unsuitable for high-speed corrugating.

The principal object of the present invention is to provide a tube corrugating apparatus of the rotating head type which overcomes the above-noted disadvantages of prior apparatus of this type. A further object is to provide an improved method of corrugating tubes.

According to the method of the present invention, the periphery of the tube to be corrugated is pressed radially inward simultaneously at a series of pressing locations spaced lengthwise along the tube and to depths which progressively increase from a first to a last location of the series. During these simultaneous multiple pressings, the tube is advanced lengthwise at constant speed in the direction from the first to the last of these pressing locations; and at the same time the pressing locations are rotated as a unit at constant speed around the advancing tube while maintaining these locations in positions to press successive turns of the groove simultaneously. In this way, each external groove making one turn around the tube is formed gradually to its final depth as the groove of initial depth is subjected in succession to the pressing operations at the subsequent pressing locations; and when each pressing location has completed its pressing action through one turn around the advancing tube, its next complete rotation around the tube will similarly press a succeeding increment of length of the advancing tube.

To maintain the pressing locations in the above-noted positions, they may be advanced lengthwise of the tube at the same speed as the tube advancement, whereby the grooves are pressed in annular form around the tube. Alternatively, the rotating pressing locations may be maintained in their above-mentioned positions by holding them fixed in the direction lengthwise of the tube advancement, whereby the grooves are pressed in spiral form around the tube with each turn forming a continuation of an adjacent turn.

In the preferred method, the tube advancing from the first series of pressing locations is pressed radially inward simultaneously at a second series of pressing locations spaced lengthwise along the tube, these last pressings being to progressively increasing depth from the first to the last location of the second series, that is, in the direction of the tube advancement. During these pressing operations at the second series of pressing locations, the latter are rotated as a unit at constant speed around the advancing tube in the direction opposite to the direction of rotation of the first-mentioned series and while maintaining the locations of the second series in positions to press successive turns of the grooves simultaneously. Thus, the grooves are pressed to still greater depth at the second series of pressing locations, and at the same time the latter serve to counteract the torsional stresses to which the advancing tube is subjected at the first series of pressing locations, since the two series are rotating in opposite directions.

An apparatus made according to the present invention comprises a head mounted for rotation about an axis, means for rotating the head at constant speed about this axis and means for advancing the tube lengthwise relative to the head at a constant speed and with the tube axis coinciding with the rotation axis. A series of tube pressing elements is carried by the head with these elements in positions to engage the periphery of the advancing tube simultaneously along a series of successive turns around the periphery as the head rotates. The apparatus also comprises means mounting the pressing elements on the rotating head in the aforesaid positions while spacing the respective elements from the rotation axis by radial distances which progressively decrease in the direction of the tube advancement, so that the pressing elements gradually press the grooves to a depth corresponding to the shortest of these radial distances.

Preferably, the mounting means for the pressing elements include a roller rotatable on the head about an axis generally parallel to the head axis, the pressing elements forming a substantially continuous spiral around the roller so that the grooves are pressed in annular form around the tube. Alternatively, each pressing element may be in the form of an annulus extending around the roller, whereby the grooves are pressed in spiral form around the tube. In either case, as the head is driven about its axis, the roller is rotated about its axis through frictional engagement of its peripheral pressing elements with the periphery of the advancing tube. Means may be provided for adjusting the roller axis relative to the head axis to vary the radial distances of the respective pressing elements from the head axis and thereby vary the depth to which each pressing element presses the successive grooves around the tube.

In one embodiment of the invention, the apparatus comprises the aforementioned rotary head carrying the roller provided with pressing elements in the form of a continuous spiral around the roller, as described above, and a second rotary head carrying a similar roller except that the spiral is of opposite hand to the spiral on the roller of the first head. In this case, the apparatus also includes means for rotating the second head at constant speed about its axis but in the direction opposite to the direction of rotation of the first head. The spiral on the roller of the second head is maintained in the annular grooves in the tube advancing from the first head, as this roller rotates about its axis on the rotating second head. Thus, the grooves initially formed as the tube advances through the first head are deepened as the tube advances through the second head; and at the same time the second head (by virtue of its rotation in the direction opposite to the rotation of the first head) acts to counteract torsional stresses to which the tube is subjected by the first head.

These and other features of the invention may be better understood by reference to the accompanying drawings, in which.

Figure 1:
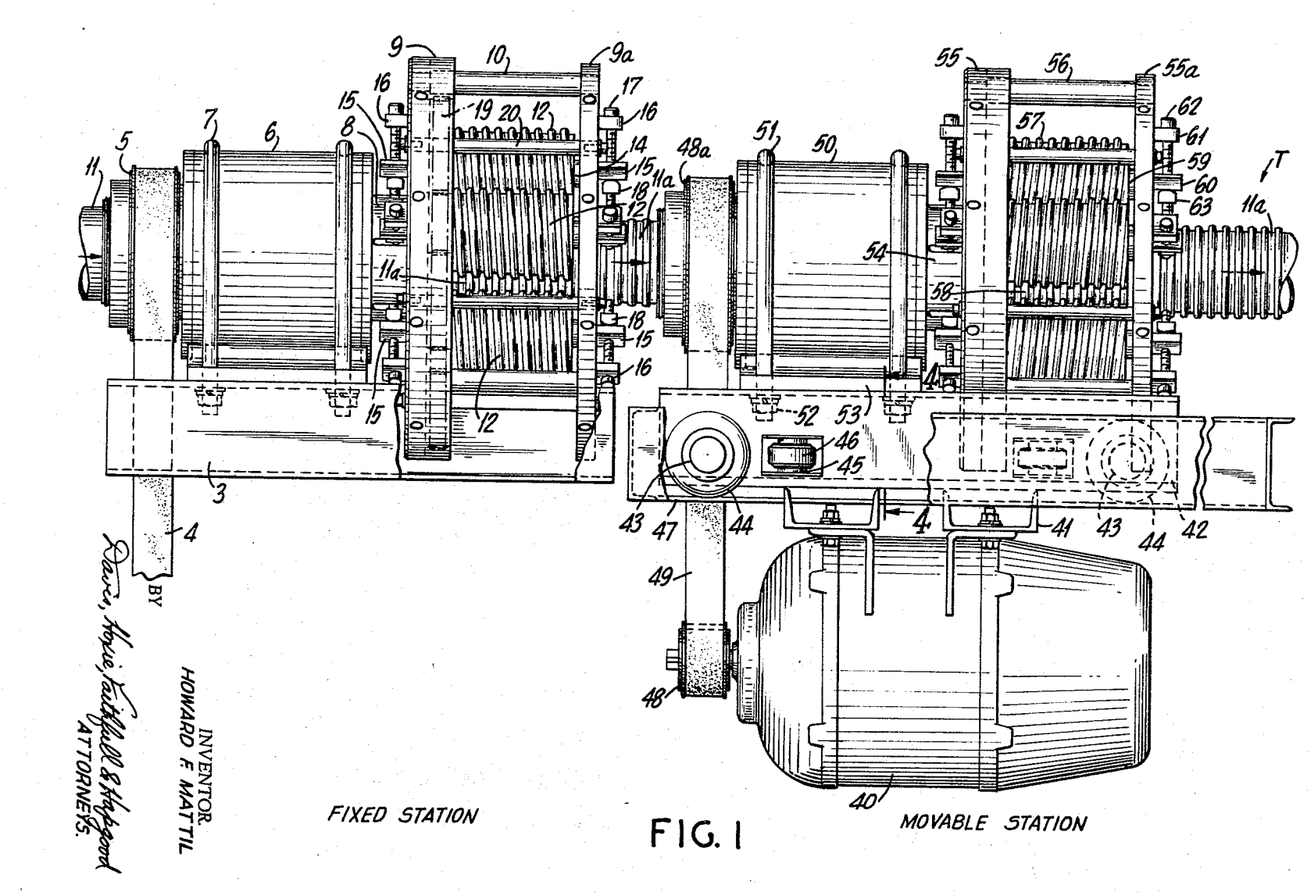
FIG. 1 is a side elevational view of a preferred form of tube corrugating machine embodying the invention.

Referring to FIG. 1, a belt 4 connects a driving pulley 4a (FIG. 7) to a driven pulley 5 rotatably mounted on a frame 3. A stationary casing 6 is attached to frame 3 by loops 7. Rotation of pulley 5 causes hollow shaft 8, attached there to, to rotate in suitable bearings (not shown) in casing 6. Face plates 9 and 9a are joined in fixed spaced relation by pins 10. Face plate 9 is rigidily attached to hollow shaft 8 and rotates therewith about tube 11 which is to be corrugated. Adjustably mounted on and spaced between face plates 9 and 9a are threaded forming rolls 12 which press annual grooves 11a to an initial depth in tube 11.

Each threaded forming roll 12 rotates about an axle 14 having end portions 15 extending through face plates 9 and 9a. Brackets 16 are rigidly attached to face plates 9 and 9a, and threaded bolts 17 pass through unthreaded holes in brackets 16 and in the axle end portions 15. A nut 18 is threaded on each bolt 17 and serves as a radially inward movement stop for the corresponding axle end portion 15. Idler gears 19 are rotatably mounted on shafts 20 which in turn are adjustably mounted on face plates 9 and 9a, and these idler gears serve for interconnecting the forming rolls 12 to synchronize their rotation. Further details of the arrangements of the forming rolls 12 and gears 19, and their associated parts, will become apparent hereinafter from the description of FIGS. 2 and 3 in connection with similar details of the final forming head.

The construction above described forms what is referred to as the Fixed Station. The rotating face plates 9 and 9a and the parts associated therewith comprise the rotating head for initially forming corrugations in tube 11.

Still referring to FIG. 1, a motor 40 is rigidly attached to a mounting 41 which is rigidly attached to a movable frame or carriage 42. The latter has transverse axles 43 provided with wheels 44 and also has vertical axles 45 provided with wheels 46. The carriage wheels 44 roll on a stationary frame 47 to permit movements of the carriage back and forth in the direction lengthwise of the initially corrugated tube 11 coming from the Fixed Station. The stationary frames 3 and 47 are fixed in position relative to each other, as by anchoring them in the usual manner to the fractory floor. Wheels 46 prevent lateral movement of carriage 42 with respect to stationary frame 47 while permitting freedom of longitudinal movement of the carriage on its wheels 44, as shown in more detail in FIG. 4.

Motor 40 operates through pulley 48 and belt 49 to impart rotation to a pulley 48a secured to a hollow shaft 54. Casing 50 is fixedly attached to carriage 42 by loops 51, nuts 52 and a mounting plate 53. Rotation of pulley 48a causes hollow shaft 54 to rotate in its supporting casing 50. Face plates 55 and 55a are joined in fixed spaced relation by pins 56. Face plate 55 is rigidly attached to hollow shaft 54 and rotates therewith about the initially corrugated tube 11 which is to be subjected to final corrugation.

Adjustably mounted on face plates 55 and 55a are threaded forming rolls 57 which press the initially formed corrugations or grooves in tube 11 to their final depth. Each threaded forming roll 57 rotates about on axle 59 having end portions 60 extending through face plates 55 and 55a. Brackets 61 are rigidly attached to face plates 55 and 55a. Threaded bolts 62 pass radially through unthreaded holes in brackets 61 and in the axle end portions 60. A nut 63 is threaded on each bolt 62 and serves as a radially inward movement stop for the corresponding axle end portion 60, as shown in more detail in FIGS. 2 and 3.

The construction above-described forms what is referred to as the Movable Station. The rotating face plates 55 and 55a and the parts associated therewith comprise the rotating head for pressing the corrugations to their final depth in tube 11, which emerges finally corrugated as shown at T in FIG. 1.

Figure 2:
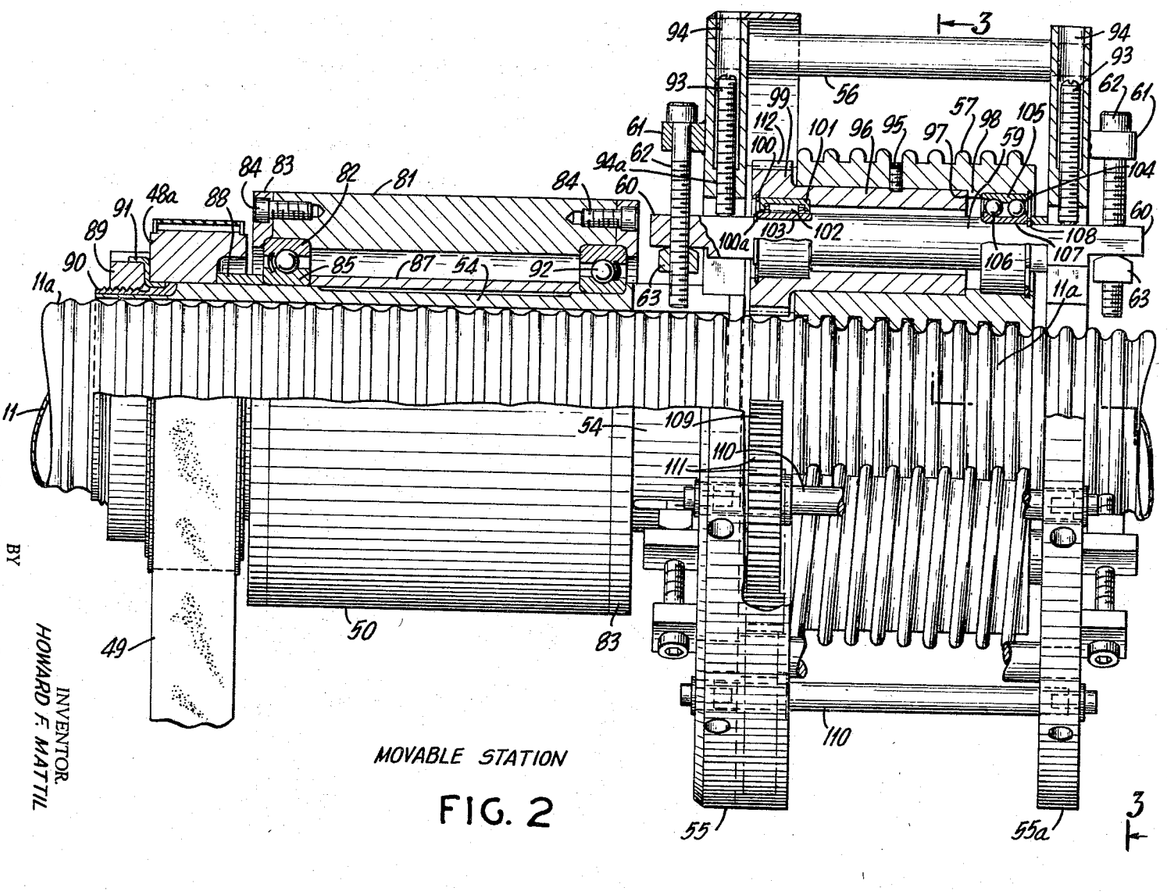
FIG. 2 is an enlarged side elevational view, with parts broken away and shown in section, of the final forming head and its associated drive mechanism illustrated in FIG. 1.

Referring now to FIG. 2, the construction and operation of Movable Station will be more fully described. Casing 50 comprises a hollow cylindrical member 81 in which are mounted outer ball-bearing races 82 held in place by removable rings 83 secured by set screws 84. Inner ball-bearing races 85 are positioned on the outer surface of hollow shaft 54 by spacing rings 87 and 88. A lock nut 89 is threaded on end portion 90 of hollow shaft 54 and is tightened against lock washer 91 to press pulley 48a against spacing ring 88. In this way, when pulley 48a is rotated by belt 49, hollow shaft 54 rotates therewith on its supporting ball-bearings 92 in casing 50.

Still referring to FIG. 2, face plate 55 is rigidly attached to hollow shaft 54 and maintains face plate 55a in fixed, spaced relation thereto by means of pin 56. Threaded forming rolls 57, shown forming the final corrugations 11a, are mounted on axles 59 by means of ball and roller-bearing assemblies described below. Brackets 61 are rigidly attached to face plates 55 and 55a. Threaded bolts 62 pass radially through unthreaded holes in brackets 61 and in end portions 60 of axles 59. Nuts 63 are threaded on bolts 62 and serve as adjustable radial stops for axle end portions 60. Screws 93 are inserted radially into holes 94 in face plates 55 and 55a. A portion 94a of each hole 94 is threaded to receive the corresponding screw 93. Adjustment of these screws 93 serves to press the corresponding end portions 60 of axles 59 radially inward against the corresponding stop nuts 63, whereby the five threaded forming rolls 57 are radially positioned relative to the axis of shaft 54 about which these rolls are spaced.

It will be understood that the radial positioning of the threaded forming rolls 57 with respect to tube 11, and thus the depth to which these rolls press the grooves or corrugations 11a in the tube 11, is controlled and regulated by adjustment of the threaded nuts 63 and screws 93. By proper adjustment of these parts, the axis of rotation of any threaded forming roll 57 can be angularly adjusted and set with respect to the axis of tube 11, as more clearly shown in FIG. 5.

Each threaded forming roll 57 is attached by means of set screw 95 to a hollow cylinder member 96, one end 97 of which abuts against an internal shoulder 98 of threaded forming roll 57, and the other end of which has a radial flange portion 99. Lock ring 100 holds outer roller-bearing race 101 in position within cylinder member 96. Roller-bearings 102 ride within this outer race and also upon an inner race 103 which is held in place on axle 59 by lock ring 100a. Lock ring 104 holds outer ball-bearing race 105 in position within hollow cylinder member 96. Ball-bearings 106 ride upon outer race 105 and upon inner race 107 which is held in place on axle 59 by lock ring 108.

Figure 3:
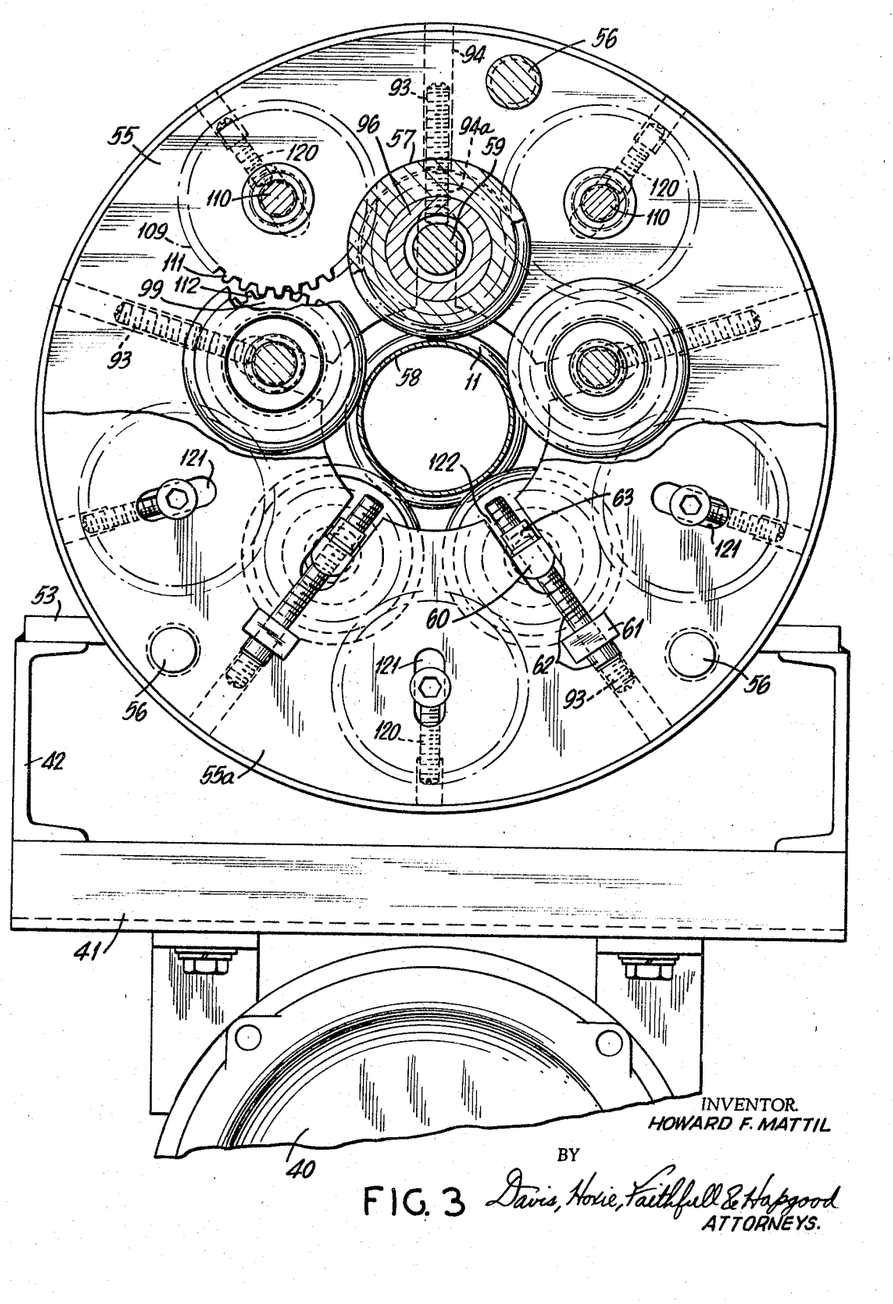
FIG. 3 is a view on the line 3—3 in FIG. 2.

Interconnection of the threaded forming rolls 57 for synchronous rotation is effected by means of idler gear wheels 109 rotatably mounted on axles 110 (FIG. 3). These axles 110 are adjustably mounted on face plates 55 and 55a. Gear teeth 111 on each idler gear wheel 109 mesh with gear teeth 112 on the radial flange portions 99 of two adjacent hollow cylinder members 96. Thus, as shown in FIG. 3 there are five idler gear wheels 109 mounted radially outward of and in staggered relation to the five forming rolls 57, so that each of the latter can be rotated only at the same speed as the others due to the interconnecting gear wheels 109.

The radial position of each idler gear wheel 109 is set by a radial adjustment screw 120 engageable with the corresponding axle 110 (FIG. 3). Consequently, the screws 120 may be adjusted to accommodate radial adjustments of the threaded forming rolls 57, as previously described, while maintaining proper intermeshing of the gear teeth 111 and 112. The axles 110 are adjusted in this manner along radial slots 121 in face plates 55 and 55a. End portions 60 of axles 59 are adjustably moved, as described above, along radial slots 122 in face plates 55 and 55a, is order to set the depth of corrugation for any particular diameter of the tube to be corrugated.

Figure 4:
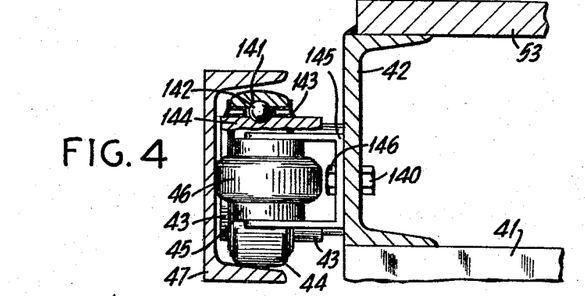
FIG. 4 is an enlarged sectional view on the line 4—4 in FIG. 1.

Referring now to FIG. 4, mounting 41 is rigidly attached to carriage 42 upon which mounting plate 53 is secured. Axle 43 is fixed to the carriage 42 by a bolt 140. Wheel 44 comprises an outer ball-bearing race 141 which confies ball-bearings 142, seal 143 and inner race 144 which is attached to axle 43. Wheel 46 is of similar construction and rotates about axle 45 carried by a bracket 145 which is attached to carriage 42 by a bolt 146.

It will be understood that the rotating heads of the Fixed Station and the Movable Station are essentially alike in the details by which their respective threaded forming rolls 12 and 57 are radially adjustable in their end plates and are interconnected through the radially adjustable idler gears 19 and 109, respectively.

Figure 5:
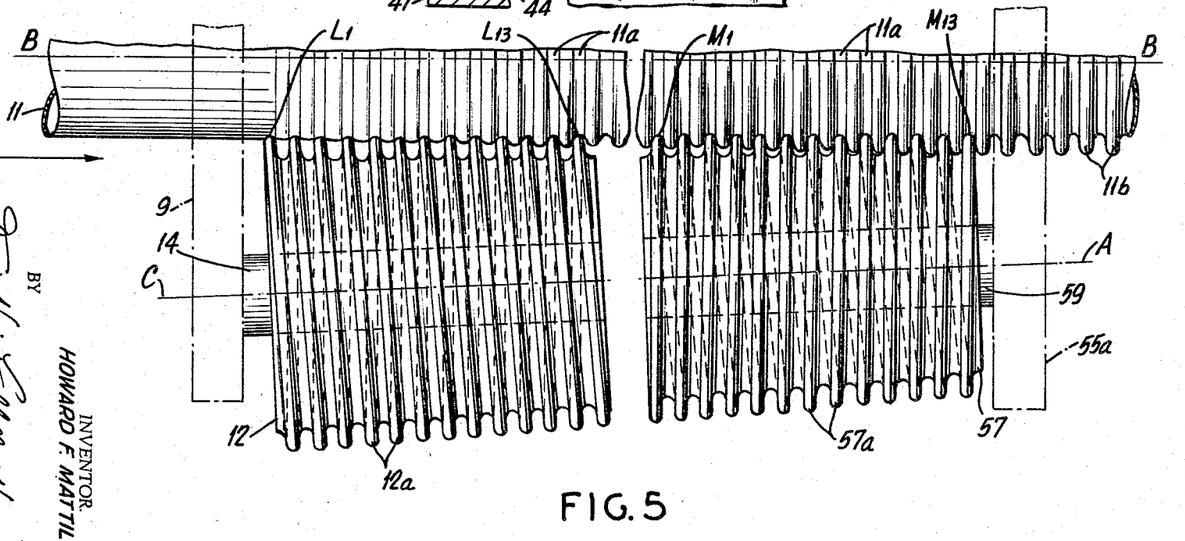
FIG. 5 is a schematic view showing threaded groove-forming rolls on the initial and final forming heads, respectively, actign upon a length of tubing to form annular grooves therein.

Referring now to FIG. 5, there are shown in outline the rotating face plate 9 of the Fixed Station and the rotating face plate 55a of the Movable Station. Also shown are one of the threaded forming rolls 12 rotating about its axle 14, and one of the threaded forming rolls 57 rotating about its axle 59.

As indicated above, face plate 9 rotates about tube 11 in a given direction, while face plate 55a rotates in an opposite direction. The threads on the forming rolls 12 of the Fixed Station are of opposite hand to those on the forming rolls 57 of the Movable Station.

By adjustment of threaded nuts 63 and screws 93, shown in FIGS. 1–3, the axis of rotation A of each threaded forming roll 57 can be angularly set and adjusted with respect to the axis B of tube 11. This angular adjustment controls the rate or increment by which the corrugations are progressively deepened. By adjustment of corresponding parts of the Fixed Station, the axis of rotation C of each threaded forming roll 12 can be angularly set and adjusted with respect to axis B of tube 11. This angular adjustment also controls the rate or increment at which the corrugations are progressively formed.

In FIG. 5, it is assumed that face plate 9 is rotated in the counter-clockwise direction (as viewed from the left) around axis B of tube 11, as the latter is advanced to the right at constant speed by tube advancing means to be described presently. The turns of screw 12a at the periphery of roller 12 extend from left to right while spiralling clockwise around the roller (as viewed from the left); and since these turns are held pressed against the tube periphery, the roller is rotated counterclockwise (as viewed from the left) about its axis C as the rotary face plate 9 is driven. Consequently, the turns of screw 12a at any instant will press the tube periphery radially inward simultaneously at a series of pressing locations spaced lengthwise along the tube, as at L1 through L13; and as face plate 9 and roller 12 rotate about their respective axes B and C, these pressing locations rotate around the tube while advancing in the direction of the tube advancement, due to the direction in which screw 12a spirals around the roller. By advancing the tube 11 at the same speed as this advancement of the pressing locations L1–L13, the spiral periphery 12a of the roller continuously forms annular grooves 11a in the tube which are spaced lengthwise thereof with a spacing corresponding to the pitch of screw 12a.

It will be observed from FIG. 5 that each turn of screw 12a around roller 12 constitutes in effect a spiral tube-pressing element forming a continuation of the preceding spiral element of a series; and the spiral elements of this series are adapted to engage the periphery of the advancing tube 11 simultaneously along a series of successive annular turns around the tube as the face plate 9 rotates. Since these spiral elements are spaced from axis B by radial distances which progressively decrease in the direction of the tube advancement (that is, from pressing location L1 to pressing location L13), these elements gradually press the annular grooves 11a to a depth determined by the shortest of these radial distances at location L13. After each spiral element or full turn of screw 12a completes a revolution about its axis C, the leading end of that spiral turn reenegages the tube periphery at the next following annular grooving turn 11a around the advancing tube; and as the lagging end of that spiral turn of screw 12a leaves an annular grooving turn 11a, the latter is immediately occupied by the leading end of the next spiral turn or pressing element (of screw 12a) which then operates on that grooving turn for a full revolution of roller 12 about its axis C.

Considering each spiral element or full turn of screw 12a, the extent to which it presses a singular annular groove 11a in the tube will depend upon the diameter of screw 12a relative to the tube diameter. For example, if these two diameters are equal, each full turn of screw 12a will press each grooving turn 11a through 360° around the tube.

In the apparatus as illustrated in FIGS. 1–3, there are five rollers 12 carried by the first head 9–9a–10 and spaced equally about the head axis. In this way, the inward grooving pressures exerted by the several rollers are balanced around the tube to prevent deflections of the tube during the grooving operations, and each annular grooving turn 11a around the tube is pressed by the spiral pressing elements of all the rollers 12, whereby the pressing action required of each roller to press the grooves 11a to a certain depth is correspondingly reduced.

Referring still to FIG. 5, the end plate 55a is assumed to be driven in the clockwise direction about axis B (as viewed from the left), and the turns of screw 57a at the periphery of roller 57 extend from left to right while spiralling counterclockwise around this roller (as viewed from the left). Thus, as rotary face plate 55a is driven, the roller 57 is rotated clockwise (as viewed from the left) about its axis A, due to the turns of screw 57a being held pressed against the tube periphery. The turns of screw 57a at any instant will press the tube grooves 11a radially inward simultaneously at a series of pressing locations spaced lengthwise along the tube, as at M1 through M13. It will be understood that the action of roller 57 and its spiral pressing elements 57a is similar to that of roller 12 and its spiral elements 12a, the roller 57 gradually pressing the gooves 11a to thei final depth determined by the radial spacing of pressing location M13 from axis B. However, since end plate 55a is rotated in the direction opposite to the rotation of end plate 9, the final forming roller 57 counteracts the torsional stresses to which tube 11 is subjected by the initial forming roller 12. By providing a group of rollers 57 equally spaced around the final forming head (FIG. 3), the advantages previously mentioned in connection with the initial forming head (with its rollers 12) are obtained.

Figure 6:
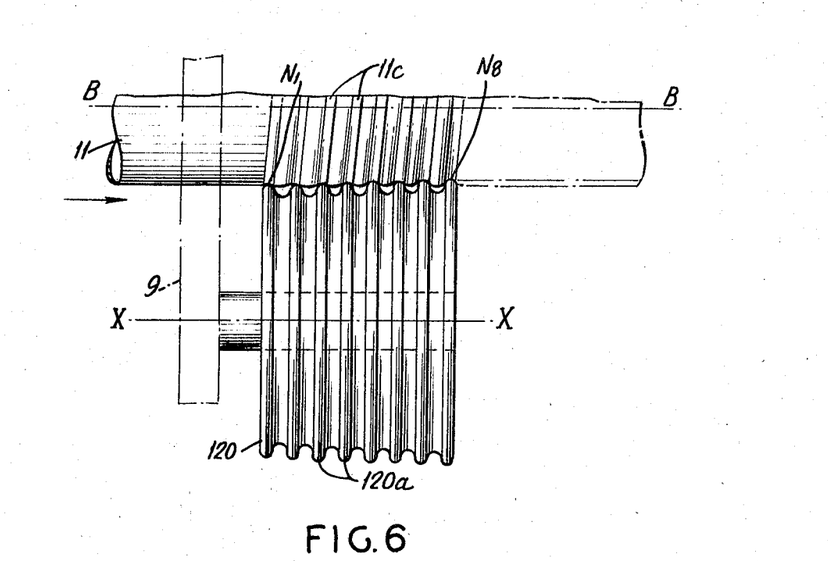
FIG. 6 is a view similar to FIG. 5 but showing a roll on the initial forming head having annular tube-pressing elements acting upon a length of tubing to form a continuous spiral groove therein.

It will be understood that the final forming head including end plate 55a is driven at a controlled speed such as to maintain the tube pressing turns or elements 57a in registry with the annular grooves 11a of the advancing tube. This speed may be controlled in any suitable manner from motor 40, but the control need not be absolutely precise because carriage 42 is movable to accommodate inaccuracies, as previously described.

Where the tube 11 is to be provided with a continuous spiral groove instead of the annular grooves 11a, the rollers 12 of the initial forming head are replaced by rollers of the type shown at 120 in FIG. 6. This roller has a series of annular tube-pressing elements 120a spaced along the roller axis X. In this case the roller axis X is shown parallel to the rotation axis B of end plate 9, and the roller is somewhat conical so that it flares in the direction of the tube advancement. Thus, at any instant the pressing turns 120a press the tube periphery radially inward simultaneously at a series of pressing locations spaced lengthwise of the tube, as shown at N1 through N8; and these pressing stations are spaced from the head axis B by radial distances which progressively decrease in the direction of the tube advancement (to the right). Consequently, the helical groove 11c is gradually pressed into the tube periphery to a depth determined by the radial spacing of the final pressing location N8 from axis B. Otherwise, the operation of the rollers 120 on the initial forming head is essentially the same as the operation of rollers 12 as previously described.

In the case of the FIG. 6 embodiment, the rollers on the final forming head 55–55a–56 are omitted, as they cannot be provided with tube pressing elements adapted to follow the spiral groove 11c formed by the initial forming roller 120, except by rotating this final forming head in the same direction as the initial forming head 9–9a–10.

Figure 7:
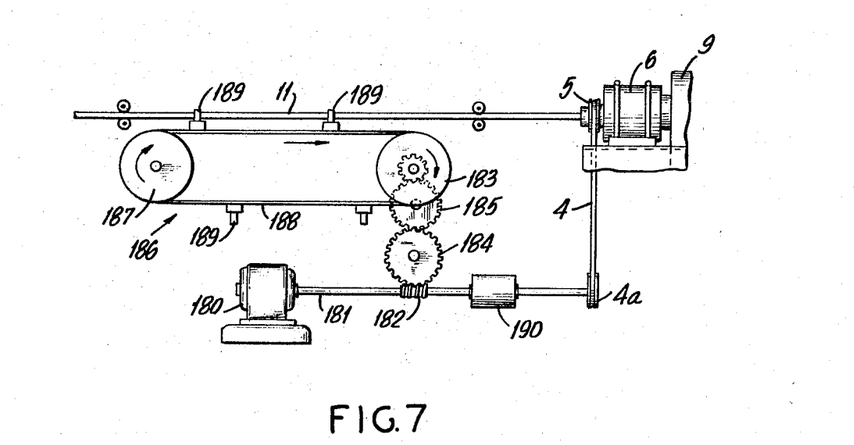
FIG. 7 is a schematic view of the drives for advancing the tube and rotating the initial forming head shown in FIG. 1.

As shown in FIG. 7, the tube 11 is advanced at constant speed by means comprising a motor 180 driving a main shaft 181. A worm 182 on shaft 181 drives a caterpillar wheel 183 through a worm gear 184 and gear 185. The caterpillar, indicated generally at 186, includes a second wheel 187 and an endless belt 188 supported by the wheels 183 and 187 and driven by wheel 183. Belt 188 carries a series of tube-clamping devices 189, each of which automatically clamps tube 11 as the device reaches the upper span of belt 188 and releases the tube as the device reaches the right-hand end of this span. Caterpillars of this type are well known in the art, one form being disclosed in U.S. Patent No. 3,023,300 dated Feb. 27, 1962.

The main shaft 181 is connected through a variable speed transmission 190 to driving pulley 4a, previously mentioned, for driving the initial forming head 9–9a–10. Therefore, this head is rotated at a speed which is definitely related to the linear speed at which tube 11 is advanced by caterpillar 186, the relation of the two speeds being determined by adjustment of the variable speed transmission 190. By properly effecting this adjustment, the annular grooves 11a are formed in the tube, as previously described in connection with FIGS. 1 through 5, and the pitch of the spiral groove 11c is determined, as will be apparent from the description in connection with FIG. 6.

I claim:

1. A method of corrugating a tube to form external grooves therein extending around the tube in turns spaced lengthwise of the tube, said method comprising the steps of pressing the tube periphery radially inward simultaneously at a series of pressing locations spaced lengthwise along the tube and to depths which progressively increase from a first to a last location of said series, advancing the tube at constant speed lengthwise during said simultaneous multiple pressings and in the direction from said first to said last location, and rotating the pressing locations as a unit at constant speed around the advancing tube while maintaining said locations in positions to press successive turns of said grooves simultaneously.

2. The method according to claim 1, in which the rotating pressing locations are held fixed lengthwise of said tube advancement, to maintain said locations in said positions, whereby said grooves are pressed in spiral form with each turn forming a continuation of an adjacent turn.

3. A method of corrugating a tube to form external grooves extending annularly around the tube in turns spaced lengthwise of the tube, said method comprising the steps of advancing the tube continuously lengthwise, pressing the periphery of the advancing tube radially inward around the tube by subjecting the periphery to a pressure contact while rotating said contact in one direction around the tube, simultaneously advancing said pressure contact in the same direction and at the same speed as the advancing tube, while applying said pressure contact to a depth progressively increasing as the tube is advanced, to form an annular groove therein, and repeating said pressing and pressure contact in a plurality of advancing steps to form successive annular grooves in the advancing tube.

4. A method according to claim 3, comprising also the steps of pressing each said groove in the advancing tube radially inward by subjecting the groove to a second pressure contact while rotating said second contact around the tube in the direction opposite to said one direction, and simultaneously advancing said second pressure contact in the same direction and at the same speed as the advancing tube, whereby said grooves are deepened.

5. Apparatus for corrugating a tube to form external grooves therein extending around the tube periphery and spaced uniformly lengthwise of the tube, said apparatus comprising a head mounted for rotation about an axis, means for rotating the head at constant speed about said axis, means for advancing the tube lengthwise relative to the head at a constant speed and with the tube axis coinciding with said rotation axis, a series of tube pressing elements carried by the head and adapted to engage the periphery of the advancing tube simultaneously along a series of successive turns around said periphery as the head rotates, and means mounting the pressing elements on the head in said positions while spacing the respective elements from said axis by radial distances which progressively decrease in the direction of the tube advancement, whereby said elements gradually press the grooves to a depth determined by the shortest of said radial distances.

6. Apparatus according to claim 5, in which said mounting means include a roller rotatable on the head about an axis generally parallel to said head axis, and said elements form a substantially continuous spiral around the roller, whereby said grooves are pressed in annular form around the tube.

7. Apparatus according to claim 5, in which said mounting means include a roller rotatable on the head about an axis generally parallel to said head axis, each of said elements being in the form of an annulus extending around the roller, whereby said grooves are pressed in spiral form around the tube.

8. Apparatus according to claim 5, in which said mounting means include a roller rotatable on the head about an axis generally parallel to said head axis, said elements extending around the roller in a series of turns, and means for adjusting said roller axis relative to said head axis to vary said radial distances.

9. Apparatus according to claim 5, in which said mounting means include adjustable means for varying said radial distances.

10. Apparatus according to claim 5, comprising also a second head spaced from the first-mentioned head in the direction of the tube advancement by said advancing means, a carriage mounting said second head for rotation about said axis, the carriage being movable freely along said axis, means for rotating the second head about said axis in the direction opposite to the direction of said rotation of the first-mentioned head, a second series of tube pressing elements carried by the second head and adapted to engage the periphery of the advancing tube simultaneously along successive grooves formed by said elements of the first head as the second head rotates, and means mounting said second series of pressing elements on the second head in said last positions while spacing the respective elements of said second series from said axis by radial distances which progressively decrease in the direction of the tube advancement and which are shorter than the first-mentioned radial distances, whereby said elements of the second series gradually press the grooves to a greater depth than the grooves are pressed by said first series of elements.

11. Apparatus according to claim 10, in which said mounting means for the second series of pressing elements include adjustable means for varying said radial distances of said last elements.

12. Apparatus for corrugating a tube to form external grooves therein extending around the tube periphery and spaced uniformly lengthwise of the tube, said apparatus comprising a head mounted for rotation about an axis, means for rotating the head at constant speed about said axis, means for advancing the tube lengthwise relative to the head at a constant speed and with the tube axis coinciding with said rotation axis, a plurality of rollers carried by the head and spaced around said axis, each roller being rotatable on the head about an axis generally parallel to said head axis, a series of tube pressing elements extending around each roller in tube pressing turns which are spaced along the roller axis in positions to engage the periphery of the advancing tube simultaneously along a series of successive turns around said periphery as the head rotates, said pressing turns of each roller having respective minimum radial spacings from said head axis which progressively decrease in the direction of the tube advancement, and means interconnecting said rollers for synchronizing rotation thereof, whereby said elements gradually press the grooves to a depth corresponding to the shortest of said radial spacings.

13. Apparatus according to claim 12, comprising also means for adjusting each roller axis relative to said head axis.

14. Apparatus according to claim 12, comprising also a second head spaced from the first-mentioned head in the direction of said tube advancement, a carriage mounting said second head for rotation about said axis, the carriage being movable along said axis, means for rotating the second head about said axis in the direction opposite to the direction of rotation of said first head, a plurality of additional rollers carried by the second head and spaced around said axis, each of said additional rollers being rotatable on the second head about an axis generally parallel to said head axis, a series of additional tube pressing elements extending around each said additional roller in the tube pressing turns which are spaced along the roller axis in positions to engage the periphery of the advancing tube simultaneously along successive grooves formed by said pressing elements of said first head as the second head rotates, said pressing turns of each said additional roller having respective minimum radial spacings from said head axis which progressively decrease in the direction of the tube advancement and which are shorter than said minimum radial spacings of said pressing turns on the rollers of said first head, and means interconnecting said additional rollers for synchronizing rotation thereof, whereby said additional pressing elements gradually press the grooves to a greater depth than the grooves are pressed by said pressing elements of said first head.

15. Apparatus according to claim 14, in which said pressing elements on each roller form a substantially continuous spiral around the roller, said spirals on said additional rollers being of opposite hand to said spirals on the rollers of said first head, whereby said grooves are pressed in annular form around the tube.

16. In apparatus for corrugating a tube to form external grooves therein extending around the tube periphery in turns spaced lengthwise of the tube, the combination of means for advancing the tube lengthwise at constant speed, first and second heads, stationary means mounting the first head for rotation about the axis of the advancing tube, means mounting the second head for rotation about said axis and spaced from said stationary mounting means in the direction of the tube advancement, means for rotating said heads at substantially constant and equal speeds but in opposite directions about said axis, a first tube pressing element mounted on the first head and spaced from said axis to form said grooves to an initial depth in the advancing tube as the first head rotates about said axis, and a second tube pressing element mounted on the second head and located nearer said axis than is said first element, said second element being engagable in said grooves and operable to increase their depth as the second head rotates about said axis of the advancing tube.

17. The combination according to claim 16, in which said mounting means for the second head include a carriage freely movable along said axis, whereby the carriage is movable to maintain said second element in said groove upon variation of any of said speeds.

18. The combination according to claim 16, comprising also a roller mounting each tube pressing element on the corresponding head and rotatable about an axis generally parallel to said first-mentioned axis, each said element being in the form of an annulus extending around the corresponding roller, whereby said grooves are pressed in spiral form around the advancing tube.

19. The combination according to claim 16, comprising also a roller mounting each tube pressing element on the corresponding head and rotatable about an axis generally parallel to said first-mentioned axis, each said element extending around the corresponding roller in the form of a spiral which is of opposite hand to the spiral on the other roller, whereby said grooves are pressed in annular form around the advancing tube.

20. In apparatus for corrugating a tube to form external annular grooves therein extending around the tube periphery in circular turns spaced uniformly lengthwise of the tube, the combination of means for advancing the tube lengthwise at constant speed along an axis, a head mounted for rotation about said axis, a spiral element mounted on the head for rotation about an axis generally parallel to the first-mentioned axis and in position to continuously impress the periphery of the advancing tube as the head rotates, whereby the spiral element is rotated about its axis by frictional contact with the tube as the head rotates, and means for rotating the head about said head axis at a constant speed and in a direction such that said contact advances lengthwise of the head axis in the same direction and at the same speed as the tube advancement.

References Cited

UNITED STATES PATENTS

| 436,463 | 9/1890 | Richard | 72—78 |
| 1,039,707 | 10/1912 | Denne | 72—78 |
| 2,669,278 | 2/1954 | Anderson | 72—118 |
| 3,201,963 | 8/1965 | Leinbach | 72—126 |

FOREIGN PATENTS

| 55,042 | 4/1890 | Germany. |

CHARLES W. LANHAM, *Primary Examiner.*

W. H. JUST, *Assistant Examiner.*